United States Patent [19]
Campbell et al.

[11] 3,795,157
[45] Mar. 5, 1974

[54] COMBINED TRANSMISSION GEAR SELECTOR AND ENGINE SPEED CONTROL

[75] Inventors: Trevor G. Campbell, Peoria; Monte Chamberlain, Metamora, both of Ill.

[73] Assignee: Caterpillar Tractor Co., Peoria, Ill.

[22] Filed: Aug. 21, 1972

[21] Appl. No.: 282,138

[52] U.S. Cl. .................. 74/879, 74/473 R, 192/8 R
[51] Int. Cl. ...................... B60k 23/00, G05g 9/12
[58] Field of Search ........... 74/473 R, 879; 192/8 R

[56] References Cited
UNITED STATES PATENTS

| | | | |
|---|---|---|---|
| 1,819,111 | 8/1931 | Neal | 74/879 |
| 3,576,240 | 4/1971 | Nicholson | 192/8 R |
| 1,953,539 | 4/1934 | Neal | 74/879 |
| 2,077,838 | 4/1937 | Hughes et al. | 74/879 |
| 2,257,852 | 10/1971 | Nicol | 74/879 |
| 3,626,780 | 12/1971 | Lowder et al. | 74/473 R |

*Primary Examiner*—Allan D. Herrmann
*Attorney, Agent, or Firm*—Fryer, Tjensvold, Phillips & Lempio

[57] ABSTRACT

A hand-operated control assembly for accomplishing both transmission gear selection and engine speed control through a single control member or lever, gear selection being accomplished by pivotal movement of the lever and engine speed regulation being accomplished by rotation of the lever about its own axis. With the control lever being preferably movable in a conventional U-shaped pattern for gear selection, a relatively simple and novel interconnection is provided for coupling the single control lever with a transmission control selector rod and an engine speed control rod.

3 Claims, 1 Drawing Figure

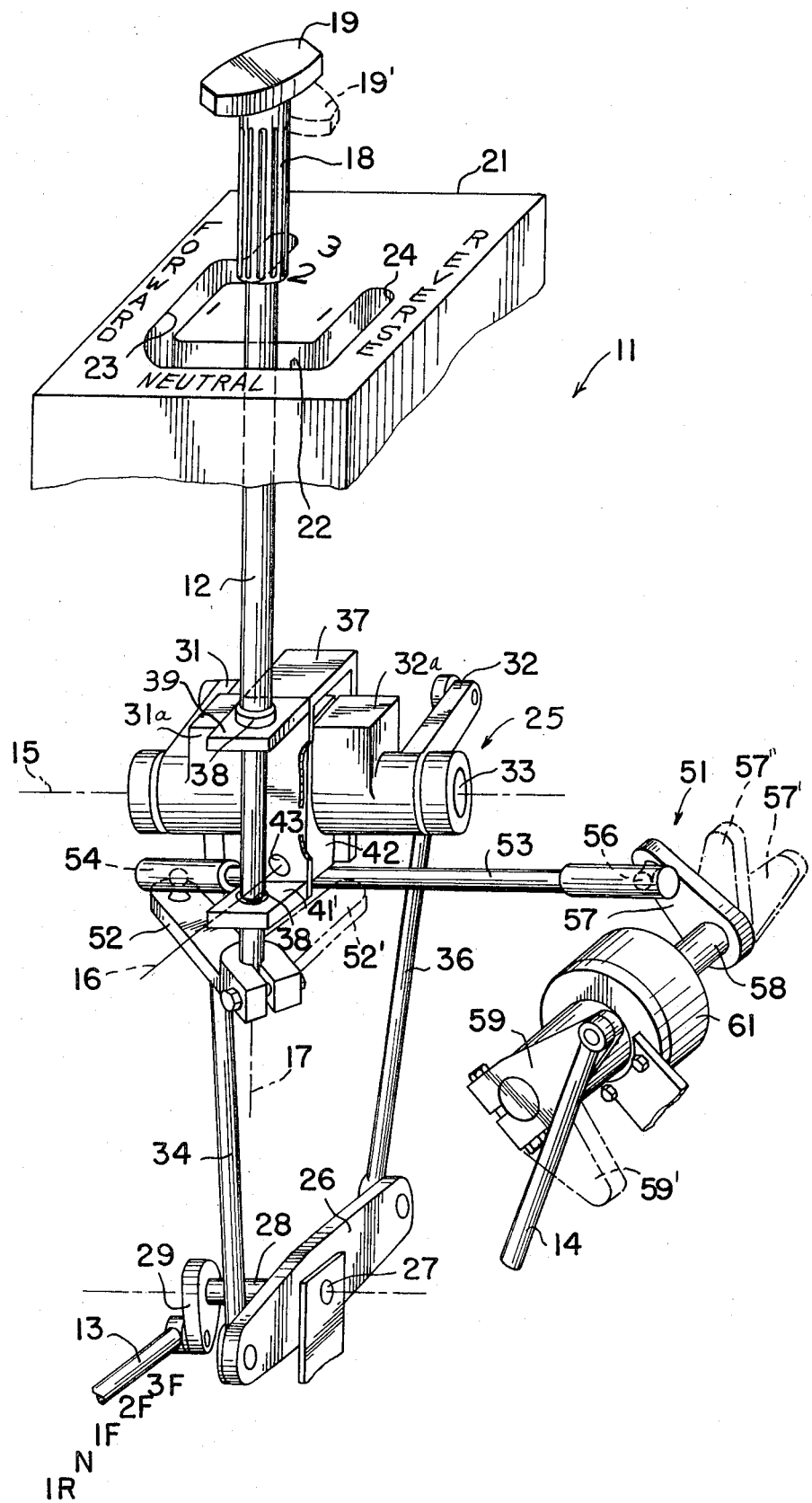

COMBINED TRANSMISSION GEAR SELECTOR AND ENGINE SPEED CONTROL

BACKGROUND OF THE INVENTION

The present invention relates to a hand-operated control assembly wherein transmission gear selection and engine speed control are accomplished respectively by pivotal movement and rotation of a single control member.

Hand-operated controls are commonly employed to perform such functions, for example on earth-moving vehicles equipped with pedal steering where both feet are used to control movement of the tracks. With such an arrangement, it is inconvenient as well as inefficient for the vehicle operator to use a foot-operated engine speed control.

It is also desirable and sometimes necessary under particular operating conditions to combine transmission gear selection and engine speed control within a single hand-operated member. For example, in earth-moving machinery of the type referred to above, the operator may have to use one hand for operating implements such as an earth-moving bucket or bulldozer blade with only the other hand being left to control both transmission gear selection and engine speed.

SUMMARY OF THE INVENTION

Accordingly, it is an object of the present invention to provide a simple and reliable hand-operated control for accomplishing both transmission gear selection and engine speed regulation. Within a preferred embodiment of the invention, a novel interconnecting arrangement responds to pivotal motion of a control member in a generally conventional U-shaped pattern to linearly operate a transmission control selector rod. Another particularly novel feature of the invention resides in the arrangement of a lever and interconnecting link for converting rotational movement of the single control member into suitable motion for operating an engine speed control rod. This arrangement avoids the use of gears meshing in rotatable engagement with the single control member while also making the speed control function of the single control member substantially independent from its pivotal movement for accomplishing transmission gear selection.

Other objects and advantages of the present invention are made apparent in the following description having reference to the accompanying drawing.

BRIEF DESCRIPTION OF THE DRAWING

The single drawing is an enlarged fragmentary view of a hand-operated control assembly constructed according to the present invention for accomplishing both transmission gear selection and engine speed regulation through a single control member.

DETAILED DESCRIPTION OF THE INVENTION

Referring now to the drawing, a hand-operated control assembly constructed to the present invention is indicated generally at 11 and includes a single control member or lever 12 for accomplishing both transmission gear selection through a transmission control selector rod indicated at 13 and engine speed regulation through an engine governor control rod indicated at 14. It may be noted that the transmission control rod moves only in generally linear fashion to accomplish both directional and speed ratio gear changes.

The control lever 12 is pivotably movable about generally transverse axes 15 and 16 which are arranged in perpendicular relation to each other as well as being rotatable about its own longitudinal axis 17. The upper end of the control lever 12 is provided with a fluted hand grip 18 as well as a control knob 19 to provide increased leverage for rotating the control lever 12. The control lever 12 could be movable through a single one of the axes 15 and 16 with such motion being transferred to the transmission control rod 13. However, to shorten the throw of the control lever 12 and to prevent accidental shifting between forward and reverse gears, the control lever 12 is guided along a U-shaped path in a generally conventional transmission pattern by means of a guide plate 21. The U-shaped path includes a crossbar 22 corresponding to neutral gear, the control member 12 and transmission control rod 13 both being shown in a neutral position. The respective legs 23 and 24 of the U-shaped pattern correspond respectively with forward and reverse operation. A plurality of speed ratio settings are provided in the forward mode of operation with corresponding positions of the transmission control rod also being indicated.

A linkage arrangement 25 converts pivotal movement of the control member 12 into generally linear motion for operating the transmission control rod 13. For this purpose, a rotatable lever 26 is pivotable about an axis 27 and is attached to the transmission control rod 13 through a shaft 28 and arm 29. Accordingly, rotation of the lever 26 about its axis 27 serves to linearly position the control rod 13. Levers 31 and 32 are each rotatably mounted upon a shaft 33 arranged along the axis 15 and are pivotably connected to opposite ends of the rotatable lever 26 by means of respective links 34 and 36. The lever 31 provides for linear movement of the rod 13 during forward operation while the lever 32 provides for positioning of the rod during reverse operation.

The control lever 12 is selectively engaged with the levers 31 and 32 by means of a yoke 37 which has bearings 38 arranged in brackets 39 and 41 to rotatably secure the control lever 12. The yoke 37 surrounds a block 42 which is also pivotably mounted upon the shaft 33. The yoke 37 is secured to the block 42 by means of a pin 43 to permit pivotable movement of the control lever 12 and yoke 37 about the axis 16. Each of the rotatable levers 31 and 32 has an offset portion, 31a and 32a respectively, arranged generally in alignment with block 42. The two levers 31 and 32 together with their respective offset portions are formed in the manner of bellcranks. As the control lever 12 is moved towards the forward leg 23, the yoke 37 moves out of register with the lever portion 32a and into encircling engagement with the lever portion 31a.

Subsequently, when the control lever is positioned for first, second or third speed ratio setting in a forward mode of operation, positioning of the transmission control rod 13 is accomplished through the lever 31 and the interconnecting link 34. Similarly, when the control member 12 is shifted towards and into the reverse leg 24, the yoke 37 encircles and engages the lever portion 32a so that the control rod 13 is moved from its neutral position N into a reverse operating position by a lever 32 and interconnecting link 36.

An interconnecting unit 51 also makes the engine governor control rod 14 responsive to rotation of the control member 12 about its own axis 17. A lever 52 is secured to the member 12 in generally close proximity to the transverse axes 15 and 16. An elongated link 53 is pivoted by means of a ball joint 54 to the lever 52 and by means of another ball joint 56 to another lever 57 which rotates a shaft 58. The shaft 58 is effectively coupled to the governor control rod 14 by means of a lever 59 so that rotation of the control member 12 results in generally linear movement of the rod 14. In the drawing, the control member 12, the lever 52, and the levers 57 and 59 are shown in a condition where the governor control rod 14 is positioned to shut off engine operation. When the control member 12 is rotated clockwise to a position illustrated in phantom for the knob at 19', the lever 52 is moved to a position indicated in phantom at 52' while the levers 57 and 59 are also moved to positions indicated in phantom at 57' and 59' respectively. With the control lever 12 being fully rotated in such clockwise fashion, the governor control rod 14 is repositioned for high idle operation with various intermediate speeds being possible between those two settings. For example, a low idle setting for the governor is illustrated by a second phantom position of the lever 57 at 57".

The interconnection between the single control member 12 and the speed control rod 14 is particularly simple in that no relatively complex and expensive gearing is employed with the rotatable member 12. The setting of the governor control rod 14 is substantially unaffected by pivotable movement of the control member 12, since the lever 52 is closely proximate to the transverse axes 15 and 16. This effect is even further enhanced by placing the link 53 in generally parallel relation with the axis 15.

A governor control locking mechanism 61 is also included within the interconnecting linkage 51 to maintain the governor control rod 14 in a setting selected by the operator. The governor control locking mechanism may be of a commercially available type, for example of the type described in U.S. Pat. No. 3,613,460 which is assigned to the assignee of the present application. Generally, such a mechanism tends to hold the shaft 58 in a fixed position. However, the mechanism may be overridden by the operator through rotation of the member 12 and movement of the interconnecting linkage 51 to reposition the rod 14.

An additional advantage is realized by positioning the present control assembly within an operator station so that the lever 12 is manipulated by the operator's left hand. If the wrist of the operator is cocked inwardly prior to shifting the control member 12 forwardly to a lower gear ratio, there is a natural tendency to rotate the member 12 in a counter-clockwise direction, thus tending to reduce the governor setting. This may be of advantage in operating earth-moving vehicles for example since the forward to reverse shifts are normally the roughest in terms of energy to be absorbed within the vehicle transmission. As the operator moves the control member 12 around the U-shaped pattern to a new speed ratio setting in the opposite direction, there is again a tendency for the wrist to cock and rotate the member 12 in a clockwise direction to return the governor rod 14 to its original setting.

It may also be noted that the present control system is primarily adapted for full engine governor control and does not particularly contemplate a decelerator system which, when the operator removes his hand from the control member 12, allows the governor control rod 14 to return to a setting established by a separate control. The present system also allows for infinite control of engine speed in each gear and in neutral.

What we claim is:

1. A combined transmission gear selector and engine speed control assembly, gear selection in forward and reverse directions being accomplished by longitudinal movement of a transmission control selector rod in respectively opposite directions from a neutral position, engine speed control being accomplished by longitudinal motion of an engine speed control rod, comprising an elongated control member movable in a U-shaped pattern for gear selection, the crossbar of the U representing neutral gear and the legs respectively representing forward and reverse directions of operation, a rotatable member secured to the transmission control selector rod, first and second levers effectively coupled to opposite ends of the rotatable member and pivoting upon a common axis transverse to the control member, yoke means secured to the control member by bearings allowing the control member to rotate about its own longitudinal axis and pivoting upon an axis generally perpendicular to the common axis of the levers and also transverse to the control member, the yoke means being selectively engaged with the respective levers by movement of the control member in the crossbar of the U-shaped pattern, and interconnecting means responsive to rotation of the control member about its axis for positioning the engine speed control rod.

2. The combined control assembly of claim 1 wherein the interconnecting means comprises a lever secured to the control member and an elongated link pivotably secured to the lever and operatively connected with the engine speed control rod.

3. The combined control assembly of claim 2 wherein the lever is secured to the control member adjacent the two axes transverse to the control member, the elongated link being generally parallel with the common axis of the first and second levers.

* * * * *